US012621566B2

(12) United States Patent
Zhang et al.

(10) Patent No.: US 12,621,566 B2
(45) Date of Patent: May 5, 2026

(54) REGION OF INTEREST-BASED PHASE DETECTION AUTOFOCUS CONTROL FOR BARCODE DECODING

(71) Applicant: ZEBRA TECHNOLOGIES CORPORATION, Lincolnshire, IL (US)

(72) Inventors: Ruth Zhang, Hauppauge, NY (US); Dongqing Chen, East Setauket, NY (US); David S. Koch, East Islip, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 38 days.

(21) Appl. No.: 18/423,106

(22) Filed: Jan. 25, 2024

(65) Prior Publication Data

US 2025/0247616 A1 Jul. 31, 2025

(51) Int. Cl.
*H04N 23/67* (2023.01)
*G06K 7/14* (2006.01)
*G06V 10/25* (2022.01)

(52) U.S. Cl.
CPC ......... *H04N 23/672* (2023.01); *G06K 7/1443* (2013.01); *G06K 7/1495* (2013.01); *G06V 10/25* (2022.01)

(58) Field of Classification Search
CPC .. H04N 23/672; G06K 7/1443; G06K 7/1495; G06V 10/25
See application file for complete search history.

(56) References Cited

U.S. PATENT DOCUMENTS

| | | | |
|---|---|---|---|
| 10,558,831 B1 * | 2/2020 | Chen .................... | G06K 7/1413 |
| 12,160,662 B2 * | 12/2024 | Trajkovic ................ | G02B 3/14 |
| 2019/0068869 A1 * | 2/2019 | Kadambala ........... | G03B 13/36 |
| 2020/0410184 A1 * | 12/2020 | Bachelder .......... | G06K 7/10811 |
| 2023/0127668 A1 * | 4/2023 | Sakurabu ............... | G06V 10/44 |
| | | | 348/208.14 |
| 2025/0080839 A1 * | 3/2025 | Galor Gluskin ....... | H04N 23/71 |

* cited by examiner

*Primary Examiner* — Shahbaz Nazrul

(57) ABSTRACT

A method includes: capturing, via an image sensor of a computing device, a first image in a sequence of images, using a first focus position of the image sensor; detecting a region of interest in the first image, the region of interest containing a barcode; determining, using a phase detection module of the image sensor, a phase difference corresponding to the region of interest; and setting a second focus position at the image sensor based on the phase difference, the second focus position configured for capturing a second image in the sequence via the image sensor, the second image having the barcode in focus.

10 Claims, 6 Drawing Sheets

REGION OF INTEREST-BASED PHASE DETECTION AUTOFOCUS CONTROL FOR BARCODE DECODING

BACKGROUND

An image-based barcode scanner may capture an image depicting multiple barcodes, and attempt to decode each barcode in the image. Under some conditions, however, e.g., dependent on ambient light levels and/or the distance between the scanner and the barcodes, the scanner may fail to decode certain barcodes in the image.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

FIG. 6 is a diagram illustrating another example performance of blocks 330 and 335 of the method of FIG. 2.

Figure 1:
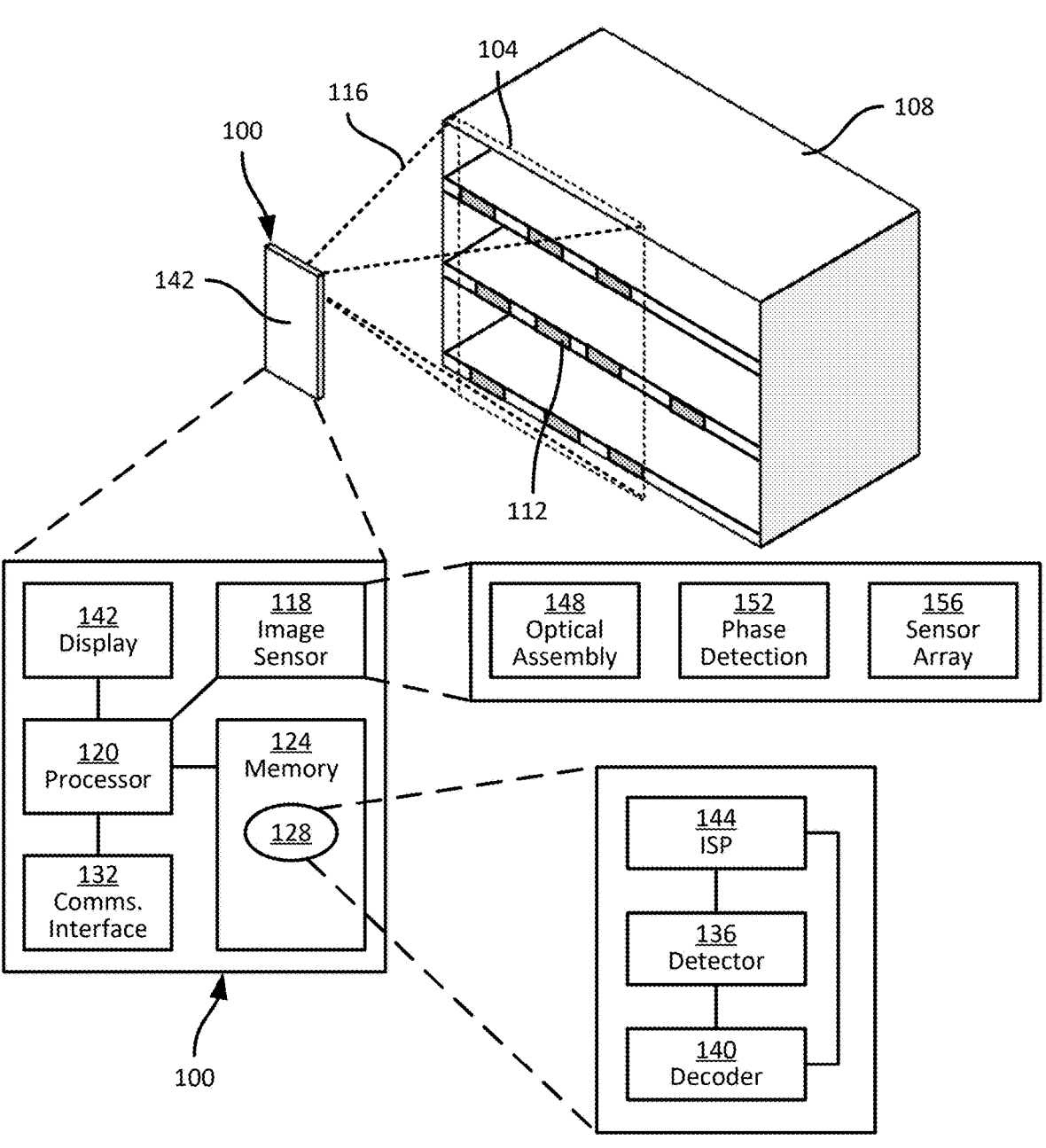
FIG. 1 is a diagram of a computing device for image-based barcode decoding.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method, comprising: capturing, via an image sensor of a computing device, a first image in a sequence of images, using a first focus position of the image sensor; detecting a region of interest in the first image, the region of interest containing a barcode; determining, using a phase detection module of the image sensor, a phase difference corresponding to the region of interest; and setting a second focus position at the image sensor based on the phase difference, the second focus position configured for capturing a second image in the sequence via the image sensor, the second image having the barcode in focus.

Additional examples disclosed herein are directed to a computing device, comprising: an image sensor; and a processor configured to: capture, via the image sensor, a first image in a sequence of images, using a first focus position of the image sensor; detect a region of interest in the first image, the region of interest containing a barcode; determine, using a phase detection module of the image sensor, a phase difference corresponding to the region of interest; and set a second focus position at the image sensor based on the phase difference, the second focus position configured for capturing a second image in the sequence via the image sensor, the second image having the barcode in focus.

FIG. 1 illustrates a computing device 100, such as a mobile computer, a smart phone, a barcode scanner, an imaging device mounted on a chassis of an autonomous or semi-autonomous apparatus, or the like. The device 100 includes a housing supporting various components of the device 100, discussed below. The device 100 can be operated to capture images, and is configured to detect barcodes within such images and to decode the detected barcodes. In the discussion below, the term "barcode" includes symbols using one-dimensional symbologies that encode data in linear arrays (e.g., UPC-A, Code 128, and the like), as well as symbols with two-dimensional symbologies (e.g., Data Matrix, QR Code, DotCode, and the like). In further embodiments, the mechanisms described below can be implemented to detect and decode other forms of machine-readable information, such text (e.g., to implement an optical character recognition process or the like).

For example, the device 100 can be operated to capture an image representing a region 104 of a shelf or other support structure 108 that supports one or more barcodes 112 (illustrated as grey boxes in FIG. 1). In the illustrated example, the support structure 108 includes shelves, and the barcodes 112 are disposed on shelf edges, e.g., facing into an aisle of a facility in which the device 100 is deployed. A wide variety of other objects, or collections of objects, can carry the barcodes 112 in other examples. For example, the barcodes 112 can be affixed to packages in a sorting facility, on products on the support structure 108, or the like. In other examples the barcodes 112 can be presented on a sheet, e.g., listing a set of items in a pallet or other aggregation of inventory. Such a sheet may therefore include a grid or list containing multiple barcodes.

The region 104 of the support structure 108 contains nine barcodes 112 in the illustrated example, although it will be understood that other images captured by the device 100 may encompass larger or smaller numbers of barcodes 112. The barcodes 112 appear at various positions within the region 104 of the support structure 108. The extent of the region 104 is determined by a field of view (FOV) 116 of an image sensor 118 of the device 100 (e.g., a camera).

The image sensor 118 can be supported by a housing of the device 100, along with various other components of the device 100, including a processor 120, such as a central processing unit (CPU), graphics processing unit (GPU), application-specific integrated circuit (ASIC), or the like. The processor 120 is communicatively coupled with a non-transitory computer-readable storage medium such as a memory 124, e.g., a combination of volatile memory elements (e.g., random access memory (RAM)) and non-volatile memory elements (e.g., flash memory or the like). The memory 124 stores a plurality of computer-readable instructions in the form of applications, including in the illustrated example a barcode detection application 128, whose execution by the processor 120 configures the device 100 to process images captured via the sensor 118 to detect and/or decode barcodes 112 therein.

The device 100 can also include a communications interface 132, enabling the device 100 to communicate with other computing devices (not shown) via any suitable communications links. The device 100 can also include one or more output devices, such as a display 142 (e.g., disposed on an opposite side of the device 100 from the sensor 118), a speaker (not shown), or the like. In other examples, the display 142 can be omitted, e.g., in the case of a barcode scanner with a ring form factor, implementations where the device 100 is a component of an autonomously-navigating apparatus, or the like. The device 100 can further include one or more input devices, such as a microphone, a touch screen (e.g., integrated with the display 142), a keypad, a scan trigger, or the like.

The device 100 implements, for example via the application 128, a detector 136 configured to process images captured via the sensor 118 to detect regions of interest therein containing barcodes, and a decoder 140 configured to process the regions of interest from the detector 136 to decode the barcodes contained in the regions of interest. The device 100 also implements an imaging controller, also referred to as an image signal processor (ISP) 144. The ISP 144 is shown as being implemented via the application 128, but in some embodiments can be implemented as a dedicated hardware controller integrated with the image sensor 118, the processor 120, or the like. The detector 136 and the decoder 140 can also be implemented via dedicated hardware rather than by the application 128 in other examples, such as a scan engine.

The ISP 144 is configured to control components of the image sensor 118 to capture images for further processing (e.g., by the detector 136 and the decoder 140). The components of the image sensor 118 controlled by the ISP 144 can include, as shown in FIG. 1, an optical assembly 148 having one or more lenses. The lens or lenses of the optical assembly 148 can be movable, e.g., under the control of the ISP 144, to alter the distance from the sensor 118 at which objects in the FOV 116 are in focus, to alter magnification applied to the FOV 116, and the like.

The image sensor 118 can also include one or more phase detection elements 152, and a sensor array 156. The array 156 can include a plurality of photodiodes (e.g., defining from several hundred thousand to millions of pixels, with the total number depending on the resolution of the image sensor 118). The nature of the phase detection elements 152 can vary for different image sensors 118, as will be apparent to those skilled in the art. For example, in some embodiments the phase detection elements 152 are dedicated photodiodes in the array 156, with masking, micromirrors, or the like, applied such that those dedicated photodiodes receive light from one half of the optical assembly. For example, the phase detection elements 152 can include numerous pairs of dedicated pixel groups (e.g., linear strips of pixels, although various shapes of pixel groups can be employed for phase detection). Each pair can include a group of pixels configured to receive light from only one side of the optical assembly, and an adjacent group (e.g., such that the groups of each pair are located physically close to one another) configured to receive light from only the other side of the optical assembly. In other examples, the phase detection elements 152 can be implemented as discrete sensor arrays from the array 156. In either of the above implementations, the phase detection elements 152 can collectively be referred to as a phase detection module.

The ISP 144 can be configured to compare the image data captured by each of the phase detection elements to implement an autofocus (AF) function. If an object in the FOV 116 is in focus, image data corresponding to that object from a phase detection element (e.g., from a given pair of adjacent groups of pixels) is substantially identical. If the image data from a given pair of adjacent pixel groups is not identical, the object is not in focus, and the ISP 144 can determine one or more lens positions, also referred to as focus positions, for the optical assembly 148 to place the object in focus based on a separation distance, also referred to as a phase difference (e.g., measured in pixels) between the images captured by the phase detection elements.

Figure 2:
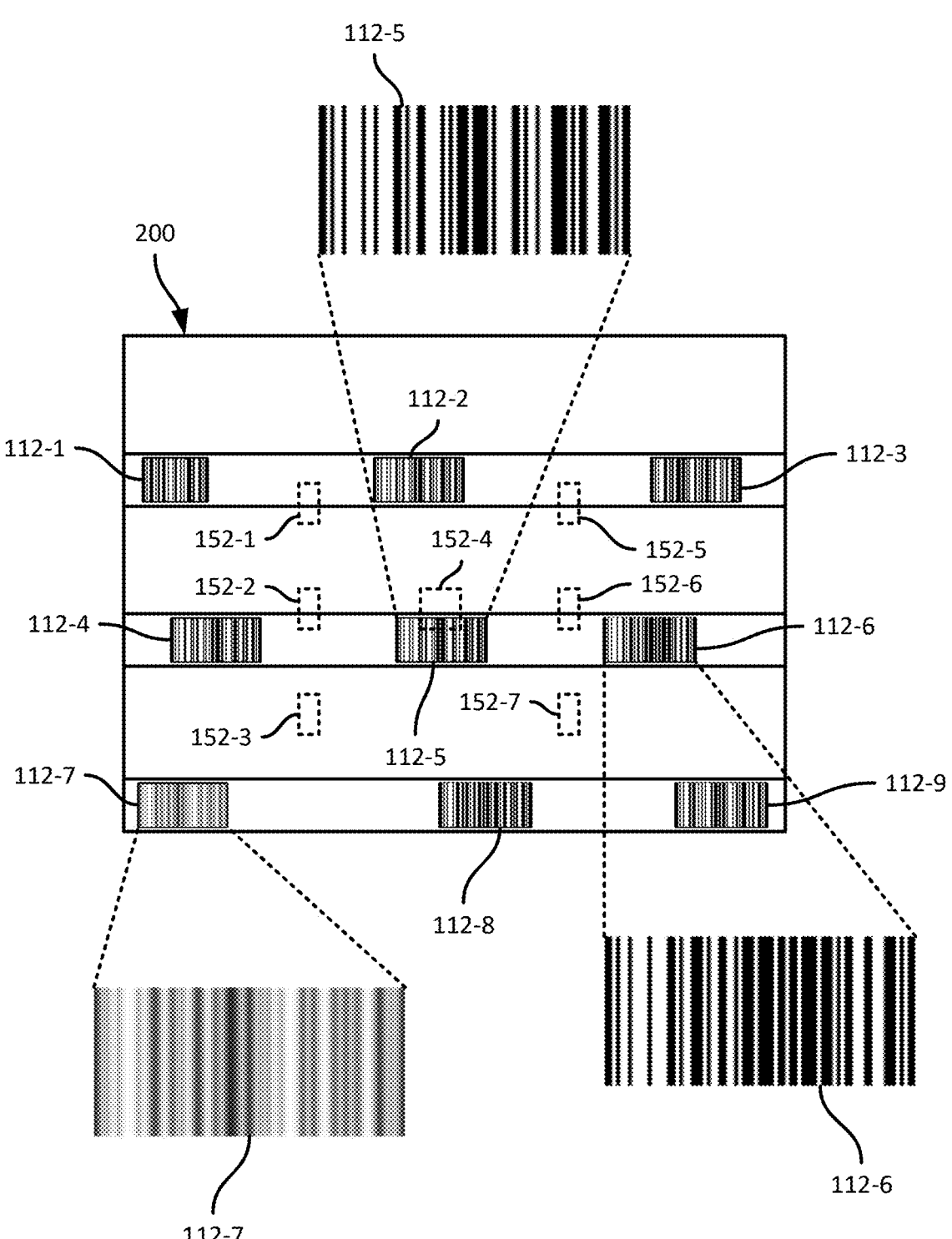
FIG. 2 is a diagram illustrating an image including a barcode affected by sub-optimal focus settings.

Referring to FIG. 2, an example image 200 captured by the sensor 118 and depicting the region 104 of the support structure 108 is illustrated. The image 200 contains the barcodes 112 mentioned in connection with FIG. 1, referred to individually in FIG. 2 as barcodes 112-1, 112-2, 112-3, 112-4, 112-5, 112-6, 112-7, 112-8, and 112-9 (collectively, the barcodes 112, and generically, a barcode 112; similar nomenclature may be used herein for other components whose reference numbers include hyphenated suffixes).

The image 200 is captured using a phase detection autofocus function implemented by the ISP 144. For example, using phase differences detected at each of a plurality of phase detection elements 152-1, 152-2, 152-3, 152-4, 152-5, 152-6, and 152-7, the ISP 144 can determine an aggregated phase difference, e.g., by averaging the individual phase differences detected at each element 152. In some examples, the ISP 144 can weight certain phase differences, such as that detected via the center element 152-7, more heavily than others. Although seven elements 152 are shown at their corresponding positions relative to the image 200 (and therefore also the sensor array 156), it will be understood that the image sensor 118 can include many more (e.g., thousands or more in some examples) elements 152 in some embodiments.

Based on the aggregated phase difference, the ISP 144 can determine a lens position to apply to the optical assembly 148 for use in capturing the image 200. For instance, the image sensor 118 can capture an initial image, assess phase differences as noted above, set the lens position, and capture the image 200. The aggregated phase difference can be determined to place a central region of the image 200 in focus, and/or to place as great an area as possible in focus. However, certain areas of the image 200, such as the area containing the barcode 112-7, may appear out of focus and therefore blurry, as shown in FIG. 2 (in contrast to the barcodes 112-16 and 112-5). Which objects in the FOV 116 appear out of focus may depend in part on the depth of field (DoF) achievable by the image sensor 118, which is in turn dependent on the distance between the sensor 118 and the objects. For example, when the sensor 118 is further from the objects in the FOV 116 (e.g., more than about four meters away), substantially the entire scene may be in focus, because the sensor 118 may have a substantial (in some cases, effectively infinite) DoF. However, when at least some objects in the FOV 116 are closer (e.g., within a meter) to the sensor 118, the DoF achievable by the sensor 118 may be smaller, e.g., about 50 cm or less. Under such conditions, objects that are near the outer edges of the FOV 116 and therefore less likely to be prioritized for autofocus, may appear blurry in resulting images. In some cases, decoding of such barcodes 112 may fail, due to the lower fidelity with which those barcodes 112 are represented in the image 200.

When decoding fails for one or more of the barcodes 112, the device 100 may be controlled (e.g., by an operator of the device 100 or the like) to capture additional images, and repeat attempts to detect and decode the barcodes 112. However, repeated decode attempts may also fail, as certain barcodes 112 may remain out of focus. The capture and processing of at least some of the additional images may therefore be an inefficient deployment of computational resources at the device, yielding little or no results beyond the partial decode results from the image 200.

As discussed below, the device 100 is configured, e.g., via certain functions implemented by the ISP 144 and interactions between the ISP 144 and the detector 136, to implement dynamic region-based phase detection AF control for additional image captures, to reduce the number of capture attempts involved in successfully decoding the barcodes 112, including those too blurry to decode in an initial image.

Figure 3:
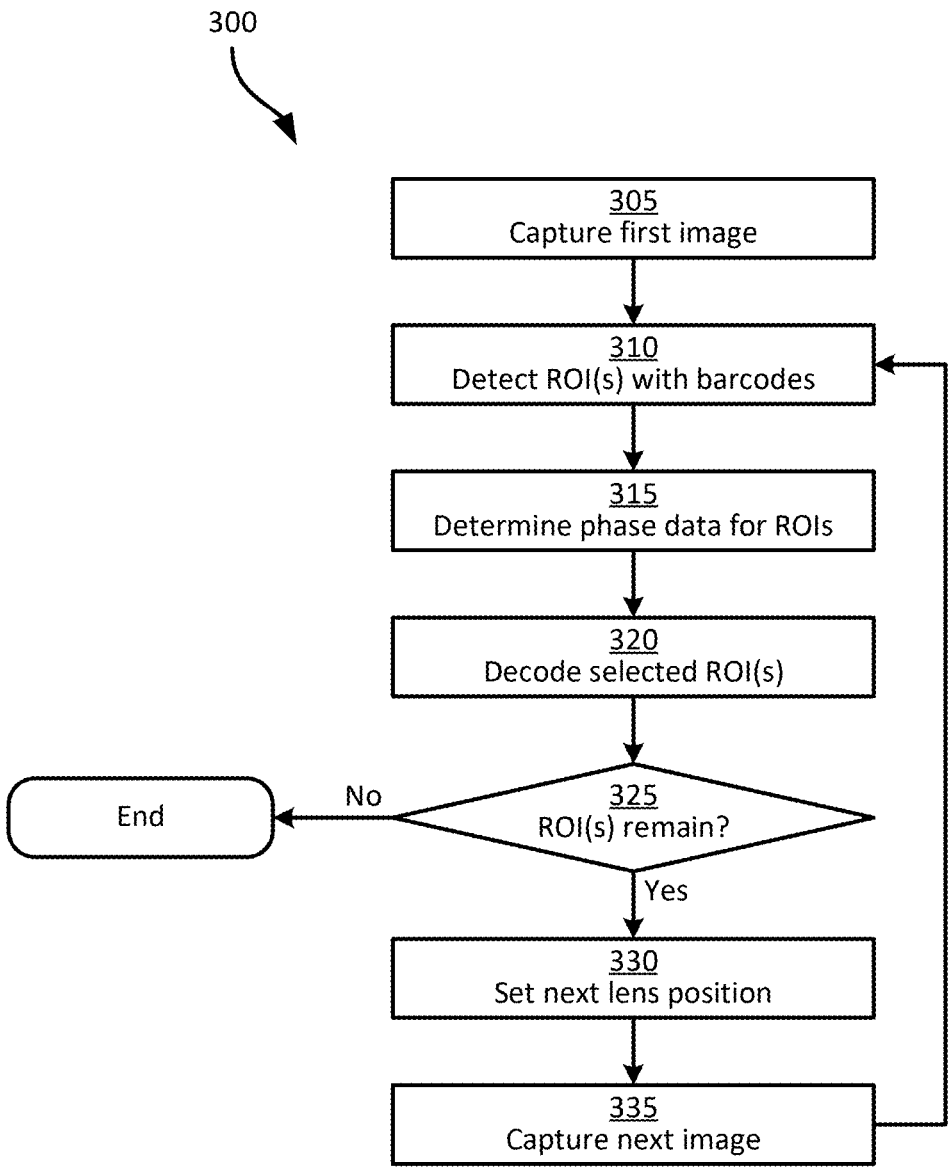
FIG. 3 is a flowchart of a method of region-based phase detection autofocus control for image-based barcode decoding.

Turning to FIG. 3, a method 300 of region-based phase detection AF control for image-based barcode decoding is illustrated. The method 300 is described below in conjunction with its performance at the device 100, e.g., via execution of the application 128 by the processor 120, and/or by equivalent dedicated hardware elements as noted earlier.

At block 305, the device 100 is configured to capture an image (e.g., the image 200 shown in FIG. 2) with AF control as outlined above (e.g., an aggregated phase difference determined based on the whole set of elements 152). For example, the processor 120 can transmit a capture command to the sensor 118, and the sensor 118 can apply a default AF control mechanism. The capture command can include a command to capture a single image frame, or to initiate capture of a sequence of image frames, e.g., in a continuous or video capture mode, at a suitable frame rate (e.g., 10 frames per second, although both slower and faster capture rates may be employed, depending on the capabilities of the sensor 118 and the computational resources available to process the captured images).

At block 310, the device 100 is configured to detect one or more regions of interest (ROI) in the image from block 305. For example, the detector 136 can be configured to detect areas in the image with vertical gradients indicating the presence of a barcode. As will be apparent to those skilled in the art, various other mechanisms can be employed to detect the positions of barcodes in the image 200. In some examples, the detector 136 can implement a machine-learning based classifier, trained to detect barcodes of various symbologies and return the positions of likely barcodes (e.g., regardless of symbology). The detector 136 produces, at block 310, one or more positions such as bounding boxes defined in image coordinates (e.g., coordinates corresponding to the sensor 118, or that can be mapped to sensor coordinates via calibration data of the sensor 118).

Figure 4:
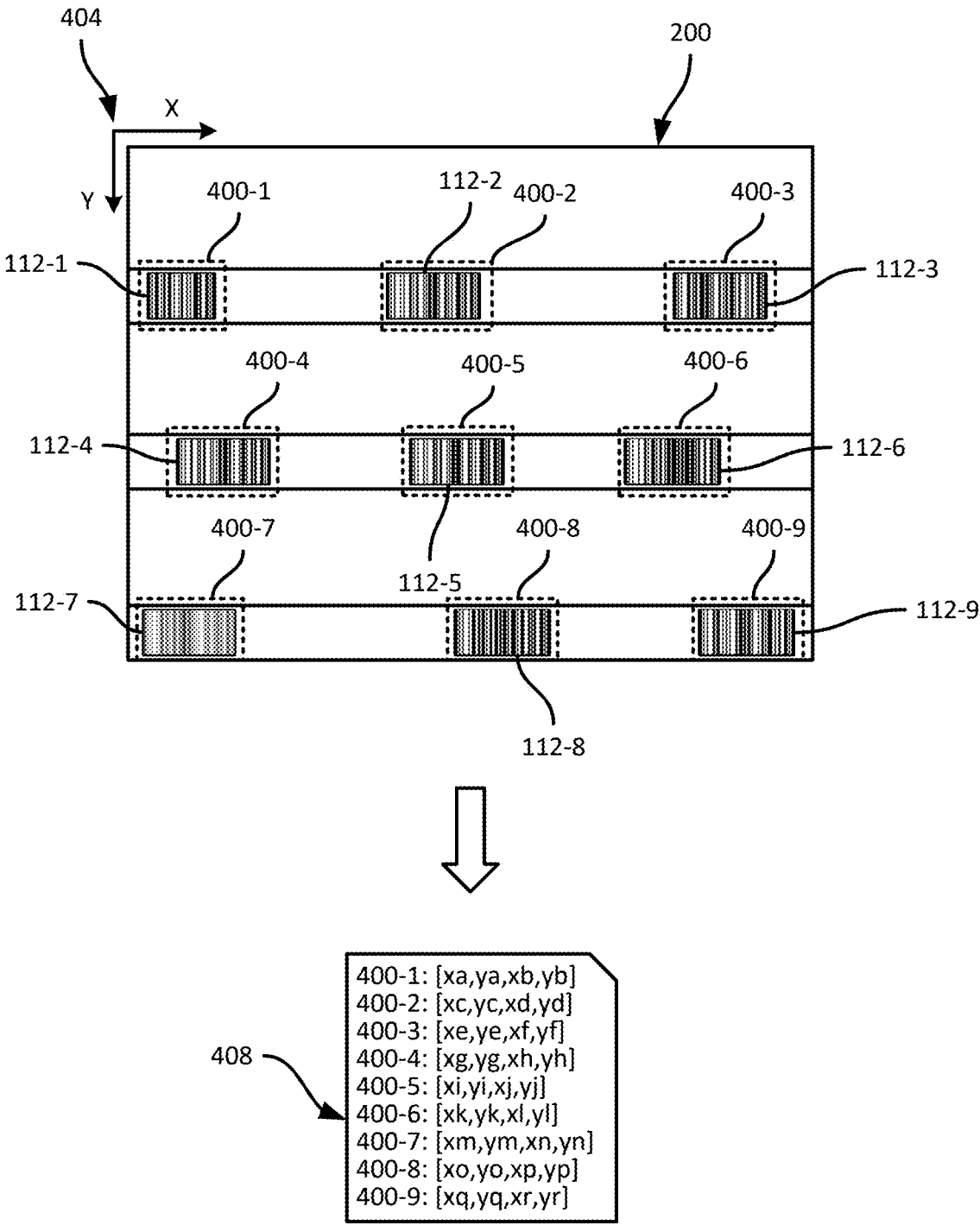
FIG. 4 is a diagram illustrating an example performance of blocks 305 and 310 of the method of FIG. 2.

FIG. 4 illustrates an example set of ROIs 400-1, 400-2, 400-3, 400-4, 400-5, 400-6, 400-7, 400-8, and 400-9 corresponding to the barcodes 112. Each ROI 400, in this example, is a rectangular bounding box which may be defined by pixel coordinates (e.g., according to a coordinate system 404) of each corner, coordinates of the upper-left corner and lower-right corner, or the like. The device 100 can be configured to store the ROIs 400, e.g., in a list 408 or other data structure in the memory 124, with each ROI 400 being defined in the list 408 by an identifier (e.g., "400-1") and a set of coordinates.

Returning to FIG. 3, at block 315 the device 100 (e.g., the ISP 144) is configured to determine phase differences corresponding to each of the regions of interest. For example, the ISP 144 can be configured to determine which subset of the elements 152 have locations that are within or at least partly within the location of a given region of interest 400. The ISP 144 can then determine an aggregated phase difference from that subset of elements 152 (or from a single element 152, if only one element 152 falls within an ROI 400).

Figure 5:
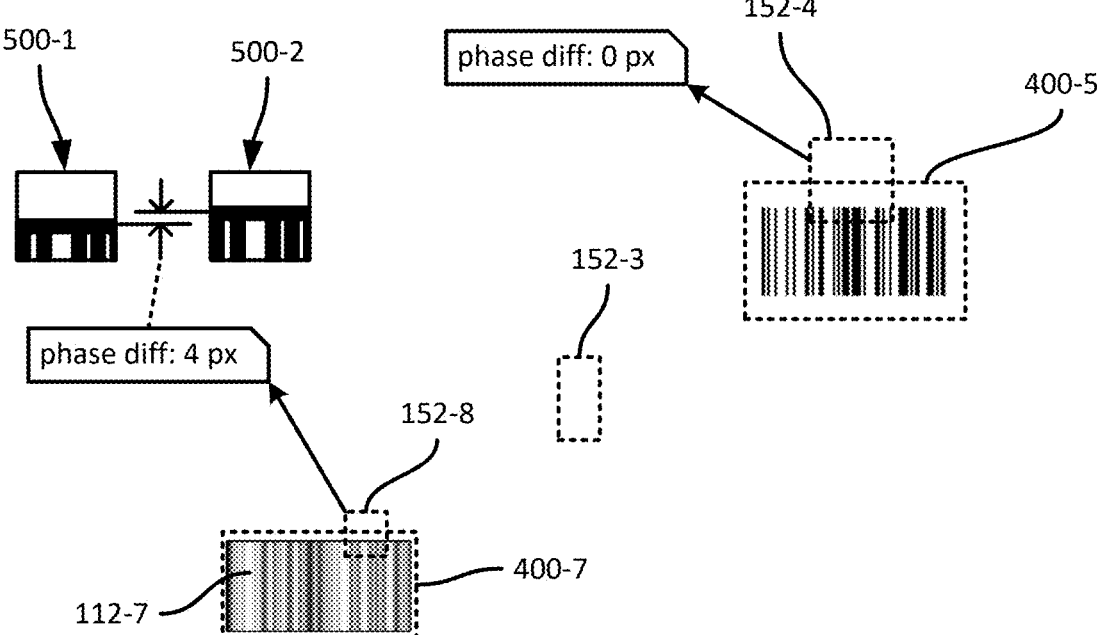
FIG. 5 is a diagram illustrating an example performance of block 315 of the method of FIG. 2.

Turning to FIG. 5, an example performance of block 315 is shown for the ROIs 400-5 and 400-7. In particular, the element 152-4 is partially included in the ROI 400-5, for example meaning that the dedicated phase detection pixels defining the element 152-4 are partially within the region of pixels of the sensor array 156 that corresponds to the pixel coordinates of the ROI 400-5. A phase difference, in this case of zero pixels (indicating that the pair of images sensed by the element 152-4 are substantially identical), is produced by the element 152-4. That phase difference therefore corresponds to the ROI 400-5. Meanwhile, a phase difference of four pixels is produced by an element 152-8 that is partially contained within the ROI 400-7. Example images 500-1 and 500-2 captured by the phase element 152-8 (e.g., by paired sets of masked pixels in the array 156) are shown, illustrating that the images 500 are offset from one another (e.g., by four pixels in this example) rather than being identical. As will be apparent, in other embodiments more than one element 152 may overlap with a given ROI 400, in which case the phase differences from each such element 152 can be summed, averaged, or the like.

Referring again to FIG. 3, at block 320 the device 100 can be configured to decode selected ROIs 400. The device 100 (e.g., the ISP 144) can select ROIs to decode (e.g., to provide to the decoder 140) by comparing the phase difference for each ROI to a threshold. The threshold can be predetermined and stored in the memory 124, e.g., as a component of the application 128. The threshold can be selected as a phase difference below which a corresponding portion of an image is likely to be sufficiently in focus to successfully decode a barcode therein.

At block 320, the device 100 can therefore determine whether any of the ROIs 400 have phase differences below the threshold, and to pass those ROIs 400 to the decoder 140. In this example, the threshold is two pixels (purely for illustrative purposes; a wide variety of other thresholds may be used), and at block 320 the device 100 therefore decodes the ROI 400-5. As will now be apparent, by forgoing an attempt to decode the ROI 400-7, the device 100 can reduce the computational resources devoted to decoding, without negatively impacting decode performance (given that the ROI 400-7 is likely to fail decoding). For illustrative purposes, it is also assumed that the device 100 decodes the ROIs 400-1 through 400-4, and 400-6, at block 320. Thus, the ROI 400-7 is the sole remaining ROI 400.

To decode an ROI 400, the detector 136 can be configured to provide the image 200 and the coordinates of each selected ROI 400 to the decoder 140. In other examples, the detector 136 can extract portions of the image 200 corresponding to each selected ROI 400, and provide the extracted portions to the decoder 140. The decoder 140 is configured to process the image 200 (or the extracted portions, as applicable) to decode each ROI 400 received from the detector 136. A wide variety of decoding mechanisms will occur to those skilled in the art for implementation by the decoder 140. The decoder 140 is configured to generate a set of decode results. The decode results include, for each ROI identifier, either a decoded value, or an indication that decoding the corresponding ROI 400 failed. The decode results can also include other information, such as the symbology of the barcode 112 in the corresponding ROI 400.

At block 325, the device 100 is configured to determine whether any barcodes remain to be decoded from the image 200. For example, the device 100 can be configured to determine whether any ROIs 400 have not yet been provided to the decoder 140, and/or whether any of the ROIs 400 provided to the decoder were not successfully decoded. When the determination at block 325 is negative, indicating that no ROIs 400 remain to be decoded, the performance of the method 300 can end. For example, as indicated by the dashed line from the "End" block to block 305, the device 100 may return to block 305 to process the a further image, e.g., when operating in a continuous capture mode, to enable the capture and decoding of barcodes on different objects (e.g., another portion of the shelf shown in FIG. 1).

When the determination at block 325 is affirmative, indicating that at least one of the ROIs 400 detected at block 310 has not yet been provided to the decoder 140 (or if provided, has not yet been successfully decoded), the device 100 proceeds to block 330. At block 330, the device 100, e.g., the ISP 144, is configured to set a lens position for the optical assembly 148, based on the phase difference(s) for any remaining ROIs 400. When a single ROI 400 remains, as in the example of FIG. 5, the lens position is set based on the phase difference for that ROI 400. The ISP 144 can, for example, convert a phase difference to a lens position according to predetermined calibration data for the sensor 118. When more than one ROI 400 remains, the ISP 144 can determine whether the remaining ROIs 400 have phase differences that differ from each other by less than a threshold (e.g., the same threshold as applied at block 320). When the phase differences are sufficiently close, the ISP 144 can generate an aggregated phase difference, e.g., by averaging the phase differences of the remaining ROIs 400, and set a lens position based on the aggregate. When the phase differences are further apart than the threshold, the ISP 144 can select one of the ROIs 400 for use at block 330 (such that the other remaining ROIs 400 may involve capturing additional images).

When the lens position has been set at block 330, the ISP 144 is configured to capture a further image at block 335. The next image is then processed as described above via blocks 310 to 325. ROIs detected in the next image can be mapped to those from the image 200, e.g., based on a degree of overlap between the positions of the ROIs. For example, an ROI with substantially matching (e.g., overlapping by at least 75%, or another suitable matching criterion) coordinates to the ROI 400-2 can be considered equivalent to the ROI 400-5, e.g., in that it likely contains the same barcode. The device 100 can therefore determine, for example, that the ROI has already been decoded.

Figure 6:
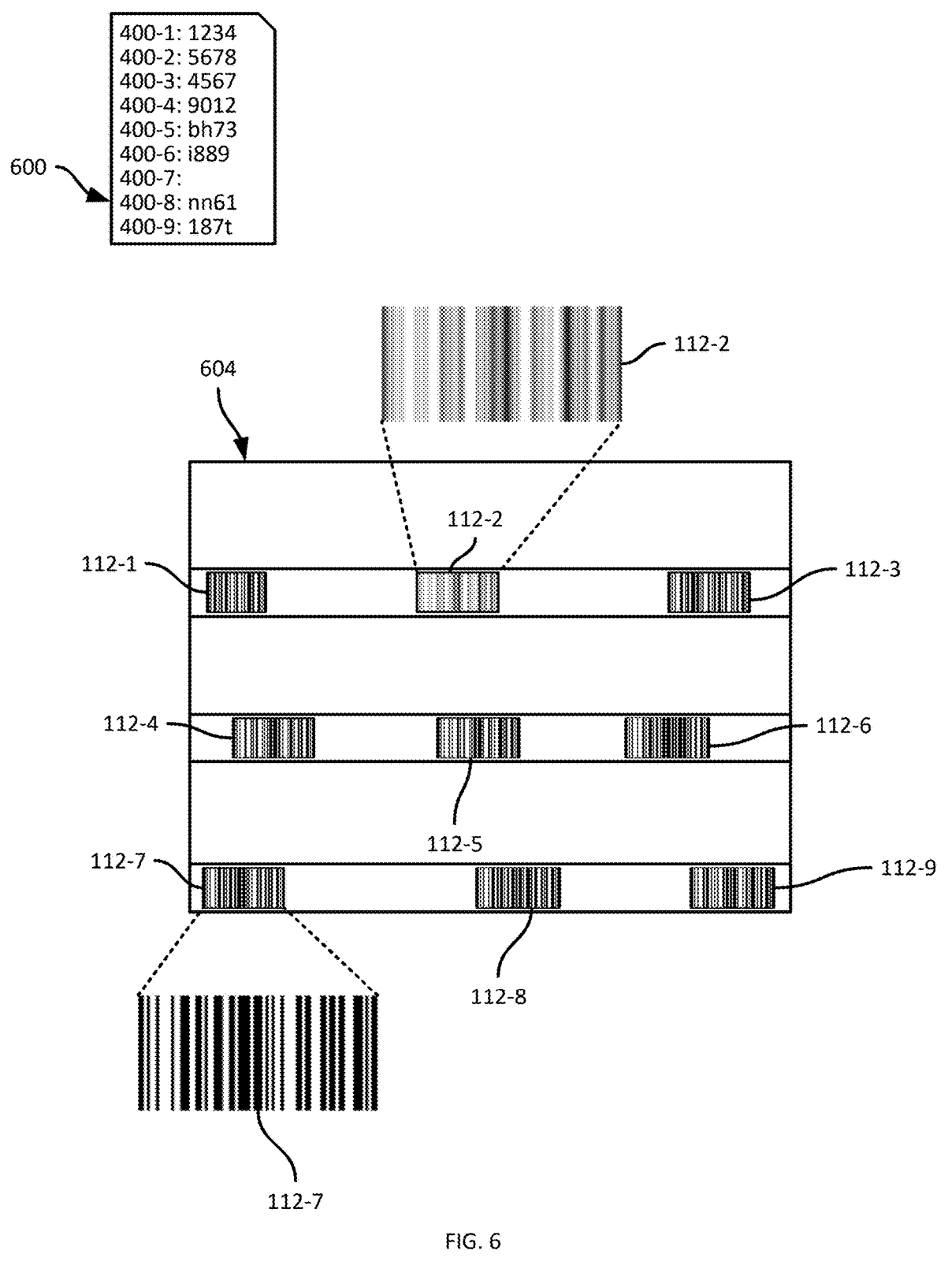

FIG. 6 illustrates a set of decode results 600 obtained from the image 200, as well as a second image 604, in which the barcode 112-7 is in focus. Although certain other barcodes, such as the barcode 112-2, are no longer in focus, those barcodes 112 were previously decoded. The device 100 can repeat the determination of phase differences for ROIs detected in the image 604. In some examples, the device 100 can omit determining phase differences for any ROIs for which a decode result has already been obtained. The above process can be repeated to capture additional images to decode further ROIs 400, until a negative determination at block 325.

As will now be apparent, implementing some or all of the functionality described at the device 100 may enable the device 100 to detect and successfully decode a plurality of barcodes within the FOV 116 with fewer image captures.

When the determination at block 325 is negative, the decode results can be output, e.g., via the display 142, the communications interface 132, or the like. In the event that all ROIs have been provided to the decoder 140, but decode results are lacking for certain ROIs, the device 100 can terminate the method 300, and generate a notification, e.g., on the display 142, indicating that certain barcodes in the FOV 116 could not be decoded.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer read- able code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Program- mable Read Only Memory), an EPROM (Erasable Program- mable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and pro- grams and ICs with minimal experimentation.

The Abstract of the Disclosure is provided to allow the reader to quickly ascertain the nature of the technical dis- closure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:

capturing, via an image sensor of a computing device, a first image in a sequence of images, using a first focus position of the image sensor;

detecting a first region of interest in the first image, the first region of interest containing a barcode;

determining, using a phase detection module of the image sensor, a phase difference corresponding to the first region of interest; and setting a second focus position at the image sensor based on the phase difference, the second focus position configured for capturing a second image in the sequence via the image sensor, the second image hav- ing the barcode in focus;

wherein the method further comprises:

detecting a plurality of regions of interest in the first image, including the first region of interest, contain- ing respective barcodes, determining respective phase differences for each of the regions of interest, and setting the second focus position based on an aggregate of a subset of the phase differences that are separated from each other by less than a threshold number of pixels.

2. The method of claim 1, wherein the phase detection module includes a plurality of phase detection elements corresponding to locations in the image; and

wherein determining the phase difference corresponding to the region of interest comprises:

determining the phase difference from a subset of the phase detection elements corresponding to locations within the region of interest.

3. The method of claim 1, further comprising:

capturing the second image in the sequence using the second focus position;

detecting a second region of interest in the second image, the second region of interest substantially matching the first region of interest and containing the barcode; and decoding the barcode from the second region of interest.

4. The method of claim 1, further comprising:

setting a third focus position based on a further subset of the phase differences, distinct from the subset, the third focus position configured for capturing a third image in the sequence via the image sensor, the third image having the barcodes corresponding to the third subset in focus.

5. The method of claim 1, further comprising:

in response to determining the phase difference, decoding the barcode from the first region of interest when the phase difference is smaller than the threshold.

6. A computing device, comprising:

an image sensor; and a processor configured to:

capture, via the image sensor, a first image in a sequence of images, using a first focus position of the image sensor;

detect a first region of interest in the first image, the first region of interest containing a barcode;

determine, using a phase detection module of the image sensor, a phase difference corresponding to the region of interest; and set a second focus position at the image sensor based on the phase difference, the second focus position con- figured for capturing a second image in the sequence via the image sensor, the second image having the barcode in focus;

wherein the processor is further configured to:

detect a plurality of regions of interest in the first image, including the first region of interest, con- taining respective barcodes, determine respective phase differences for each of the regions of interest, and set the second focus position based on an aggregate of a subset of the phase differences that are sepa- rated from each other by less than a threshold number of pixels.

7. The computing device of claim 6, wherein the phase detection module includes a plurality of phase detection elements corresponding to locations in the image; and wherein the processor is configured to determine the phase difference corresponding to the region of interest by:

determining the phase difference from a subset of the phase detection elements corresponding to locations within the region of interest.

8. The computing device of claim 6, wherein the processor is further configured to:

capture the second image in the sequence using the second focus position;

detect a second region of interest in the second image, the second region of interest substantially matching the first region of interest and containing the barcode; and decode the barcode from the second region of interest.

9. The computing device of claim 6, wherein the processor is further configured to:

set a third focus position based on a further subset of the phase differences, distinct from the subset, the third focus position configured for capturing a third image in the sequence via the image sensor, the third image having the barcodes corresponding to the third subset in focus.

10. The computing device of claim 6, wherein the processor is further configured to:

in response to determining the phase difference, decode the barcode from the first region of interest when the phase difference is smaller than the threshold.

* * * * *